(12) United States Patent
Bowler et al.

(10) Patent No.: US 11,784,679 B2
(45) Date of Patent: Oct. 10, 2023

(54) MULTI-SLOPE EQUALIZERS FOR A CABLE NETWORK

(71) Applicant: ARRIS Enterprises LLC, Suwanee, GA (US)

(72) Inventors: David B. Bowler, Stow, MA (US); Michael R. Morisseau, Lowell, MA (US)

(73) Assignee: ARRIS Enterprises LLC, Suwanee, GA (US)

( * ) Notice: Subject to any disclaimer, the term of this patent is extended or adjusted under 35 U.S.C. 154(b) by 22 days.

(21) Appl. No.: 17/696,735

(22) Filed: Mar. 16, 2022

(65) Prior Publication Data
US 2022/0302955 A1    Sep. 22, 2022

Related U.S. Application Data

(60) Provisional application No. 63/162,399, filed on Mar. 17, 2021.

(51) Int. Cl.
*H04B 3/14* (2006.01)
*H04B 3/32* (2006.01)
*H04B 3/40* (2006.01)
*H04B 3/46* (2015.01)

(52) U.S. Cl.
CPC .............. *H04B 3/141* (2013.01); *H04B 3/32* (2013.01); *H04B 3/40* (2013.01); *H04B 3/46* (2013.01)

(58) Field of Classification Search
CPC . H04B 3/141; H04B 3/32; H04B 3/46; H04B 3/40; H04B 3/143; H04L 25/03878; H04N 7/102
See application file for complete search history.

(56) References Cited

U.S. PATENT DOCUMENTS

| | | |
|---|---|---|
| 2007/0061861 A1 | 3/2007 | Strull et al. |
| 2010/0120386 A1* | 5/2010 | Konstantinos ....... H04B 1/0025 348/731 |
| 2020/0099416 A1* | 3/2020 | Dick ................. H04L 25/03057 |
| 2020/0252249 A1 | 8/2020 | Finkelstein |
| 2022/0231716 A1* | 7/2022 | Sjöland ................ H04B 1/1638 |

FOREIGN PATENT DOCUMENTS

AU    2021104195 A4    9/2021

OTHER PUBLICATIONS

International Search Report and Written Opinion RE: Application No. PCT/US2022/020649, dated Jun. 24, 2022.

* cited by examiner

*Primary Examiner* — Khanh C Tran
(74) *Attorney, Agent, or Firm* — Chernoff, Vilhauer, McClung & Stenzel, LLP

(57) ABSTRACT

A cable network that includes a multi-slope equalizer and/or cable simulator.

20 Claims, 19 Drawing Sheets

| FREQUENCY (MHz) | EQ-6 | | | EQ-10 | | | EQ-16 | | |
|---|---|---|---|---|---|---|---|---|---|
| | 1.0 GHz | 1.8 GHz | DELTA | 1.0 GHz | 1.8 GHz | DELTA | 1.0 GHz | 1.8 GHz | DELTA |
| 5 | 7.0 | 11.8 | -4.8 | 11.0 | 18.9 | -7.9 | 17.0 | 29.7 | -12.7 |
| 204 | 5.8 | 10.6 | -4.8 | 9.0 | 16.9 | -7.9 | 13.8 | 26.5 | -12.7 |
| 258 | 5.5 | 10.2 | -4.8 | 8.5 | 16.4 | -7.9 | 12.9 | 25.6 | -12.7 |
| 1002 | 1.0 | 5.8 | -4.8 | 1.0 | 8.9 | -7.9 | 1.0 | 13.7 | -12.7 |
| 1794 | | 1.0 | | | 1.0 | | | 1.0 | |

EQUALIZERS

MULTI-SLOPE EQUALIZERS FOR A CABLE NETWORK

CROSS REFERENCE TO RELATED APPLICATIONS

This application claims the benefit of U.S. Provisional Patent Application Ser. No. 63/162,399 filed Mar. 17, 2021.

BACKGROUND

The subject matter of this application relates to multi-slope cable simulators and/or equalizers for a cable network.

Cable Television (CATV) services provide content to large groups of customers (e.g., subscribers) from a central delivery unit, generally referred to as a "head end," which distributes channels of content to its customers from this central delivery unit through an access network comprising a hybrid fiber coax (HFC) cable plant, including associated components (nodes, amplifiers and taps). Modern Cable Television (CATV) service networks, however, not only provide media content such as television channels and music channels to a customer, but also provide a host of digital communication services such as Internet Service, Video-on-Demand, telephone service such as VoIP, home automation/security, and so forth. These digital communication services, in turn, require not only communication in a downstream direction from the head end, through the HFC, typically forming a branch network and to a customer, but also require communication in an upstream direction from a customer to the head end typically through the HFC network.

To this end, CATV head ends have historically included a separate Cable Modem Termination System (CMTS), used to provide high speed data services, such as cable Internet, Voice over Internet Protocol, etc. to cable customers and a video headend system, used to provide video services, such as broadcast video and video on demand (VOD). Typically, a CMTS will include both Ethernet interfaces (or other more traditional high-speed data interfaces) as well as radio frequency (RF) interfaces so that traffic coming from the Internet can be routed (or bridged) through the Ethernet interface, through the CMTS, and then onto the RF interfaces that are connected to the cable company's hybrid fiber coax (HFC) system. Downstream traffic is delivered from the CMTS to a cable modem and/or set top box in a customer's home, while upstream traffic is delivered from a cable modem and/or set top box in a customer's home to the CMTS. The Video Headend System similarly provides video to either a set-top, TV with a video decryption card, or other device capable of demodulating and decrypting the incoming encrypted video services. Many modern CATV systems have combined the functionality of the CMTS with the video delivery system (e.g., EdgeQAM—quadrature amplitude modulation) in a single platform generally referred to an Integrated CMTS (e.g., Integrated Converged Cable Access Platform (CCAP))—video services are prepared and provided to the I-CCAP which then QAM modulates the video onto the appropriate frequencies. Still other modern CATV systems generally referred to as distributed CMTS (e.g., distributed Converged Cable Access Platform) may include a Remote PHY (or R-PHY) which relocates the physical layer (PHY) of a traditional Integrated CCAP by pushing it to the network's fiber nodes (R-MAC PHY relocates both the MAC and the PHY to the network's nodes). Thus, while the core in the CCAP performs the higher layer processing, the R-PHY device in the remote node converts the downstream data sent from the core from digital-to-analog to be transmitted on radio frequency to the cable modems and/or set top boxes and converts the upstream radio frequency data sent from the cable modems and/or set top boxes from analog-to-digital format to be transmitted optically to the core.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
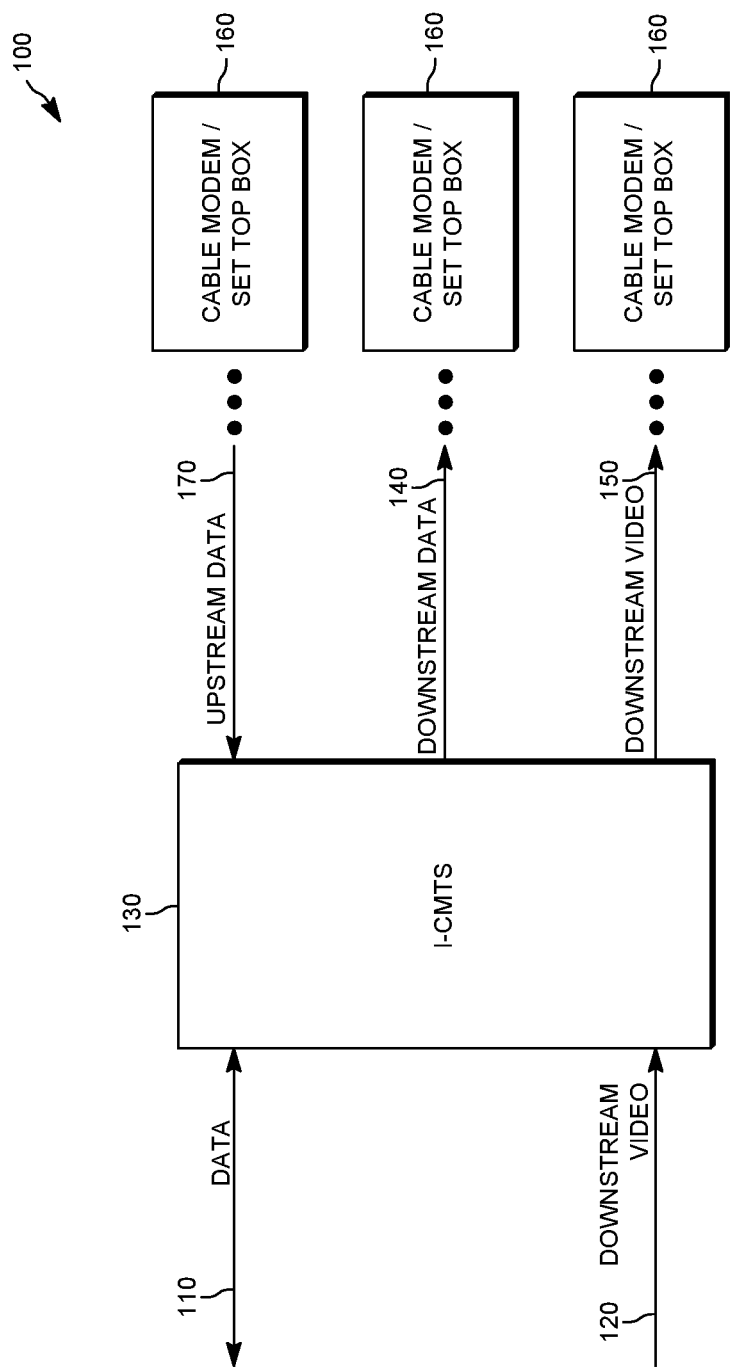
FIG. 1 illustrates an integrated Cable Modem Termination System.

Referring to FIG. 1, an integrated CMTS (e.g., Integrated Converged Cable Access Platform (CCAP)) 100 may include data 110 that is sent and received over the Internet (or other network) typically in the form of packetized data. The integrated CMTS 100 may also receive downstream video 120, typically in the form of packetized data from an operator video aggregation system. By way of example, broadcast video is typically obtained from a satellite delivery system and pre-processed for delivery to the subscriber though the CCAP or video headend system. The integrated CMTS 100 receives and processes the received data 110 and downstream video 120. The CMTS 130 may transmit downstream data 140 and downstream video 150 to a customer's cable modem and/or set top box 160 through a RF distribution network, which may include other devices, such as amplifiers and splitters. The CMTS 130 may receive upstream data 170 from a customer's cable modem and/or set top box 160 through a network, which may include other devices, such as amplifiers and splitters. The CMTS 130 may include multiple devices to achieve its desired capabilities.

Figure 2:
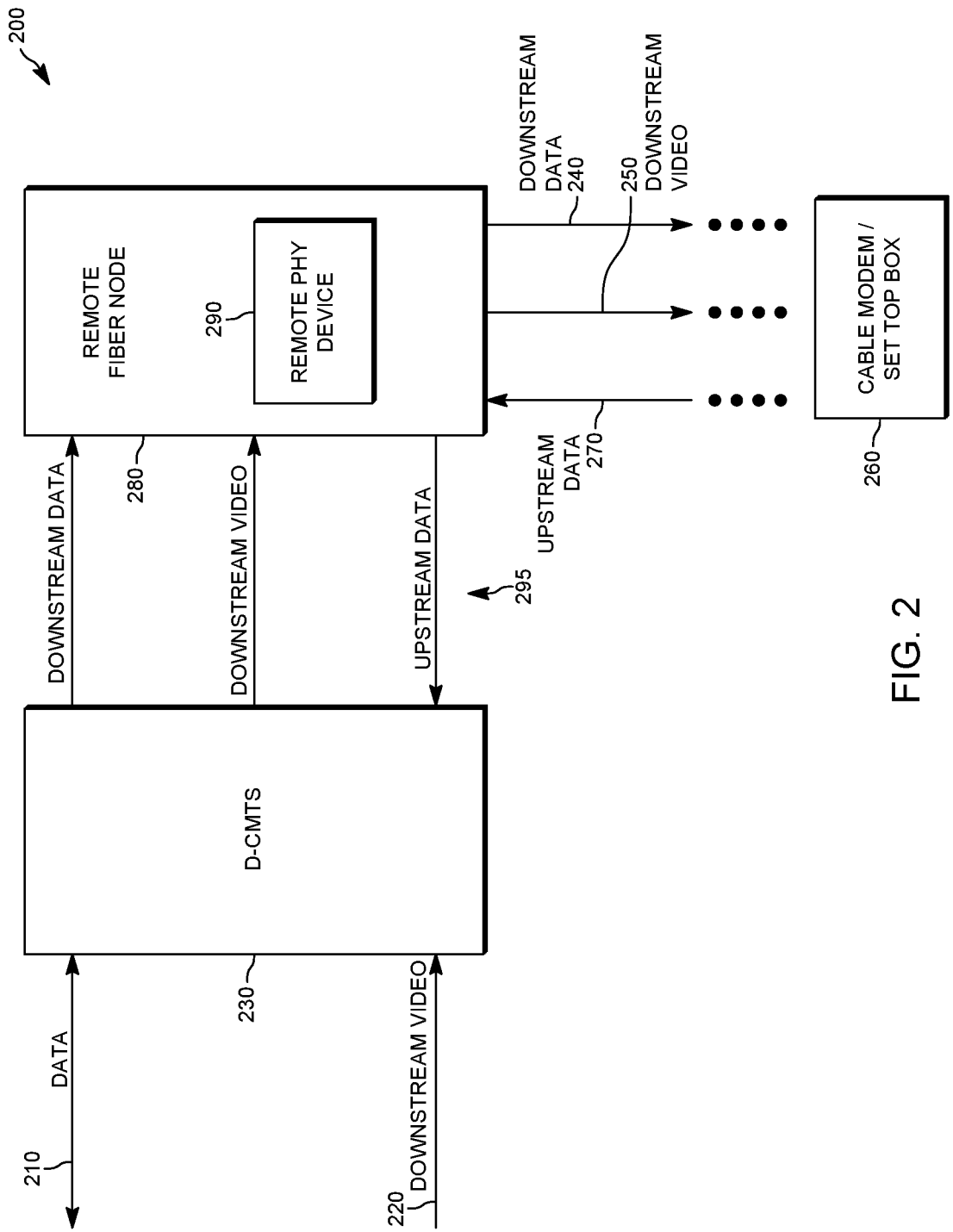
FIG. 2 illustrates a distributed Cable Modem Termination System.

Referring to FIG. 2, as a result of increasing bandwidth demands, limited facility space for integrated CMTSs, and power consumption considerations, it may be desirable to include a Distributed Cable Modem Termination System (D-CMTS) 200 (e.g., Distributed Converged Cable Access Platform (CCAP)). In general, the CMTS is focused on data services while the CCAP further includes broadcast video services. The D-CMTS 200 distributes a portion of the functionality of the I-CMTS 100 downstream to a remote location, such as a fiber node, using network packetized data. An exemplary D-CMTS 200 may include a remote PHY architecture, where a remote PHY (R-PHY) is preferably an optical node device that is located at the junction of the fiber and the coaxial. In general, the R-PHY often includes the PHY layers of a portion of the system. The D-CMTS 200 may include a D-CMTS 230 (e.g., core) that includes data 210 that is sent and received over the Internet (or other network) typically in the form of packetized data. The D-CMTS 200 may also receive downstream video 220, typically in the form of packetized data from an operator video aggregation system. The D-CMTS 230 receives and processes the received data 210 and downstream video 220. A remote Fiber node 280 preferably includes a remote PHY device 290. The remote PHY device 290 may transmit downstream data 240 and downstream video 250 to a customer's cable modem and/or set top box 260 through a network, which may include other devices, such as amplifier and splitters. The remote PHY device 290 may receive upstream data 270 from a customer's cable modem and/or set top box 260 through a network, which may include other devices, such as amplifiers and splitters. The remote PHY device 290 may include multiple devices to achieve its desired capabilities. The remote PHY device 290 primarily includes PHY related circuitry, such as downstream QAM modulators, upstream QAM demodulators, together with pseudowire logic to connect to the D-CMTS 230 using network packetized data. The remote PHY device 290 and the D-CMTS 230 may include data and/or video interconnections, such as downstream data, downstream video, and upstream data 295. It is noted that, in some embodiments, video traffic may go directly to the remote physical device thereby bypassing the D-CMTS 230. In some cases, the remote PHY and/or remote MAC PHY functionality may be provided at the head end.

By way of example, the remote PHY device 290 may covert downstream DOCSIS (i.e., Data Over Cable Service Interface Specification) data (e.g., DOCSIS 1.0; 1.1; 2.0; 3.0; 3.1; and 4.0 each of which are incorporated herein by reference in their entirety), video data, out of band signals received from the D-CMTS 230 to analog for transmission over RF or analog optics. By way of example, the remote PHY device 290 may convert upstream DOCSIS, and out of band signals received from an analog medium, such as RF or linear optics, to digital for transmission to the D-CMTS 230. As it may be observed, depending on the particular configuration, the R-PHY may move all or a portion of the DOCSIS MAC and/or PHY layers down to the fiber node.

Figure 3:
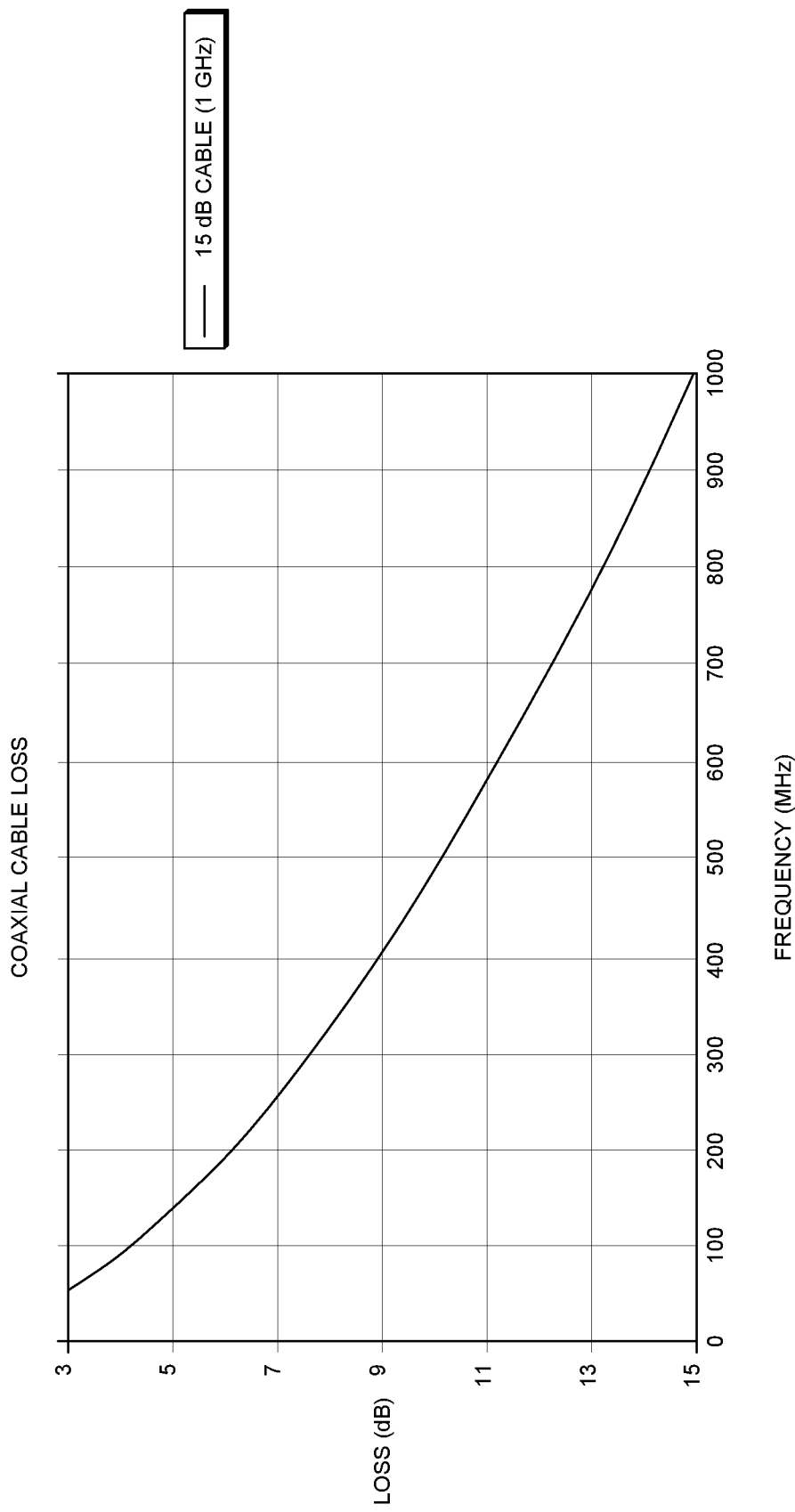
FIG. 3 illustrates a graph of coaxial cable loss.
Figure 4:
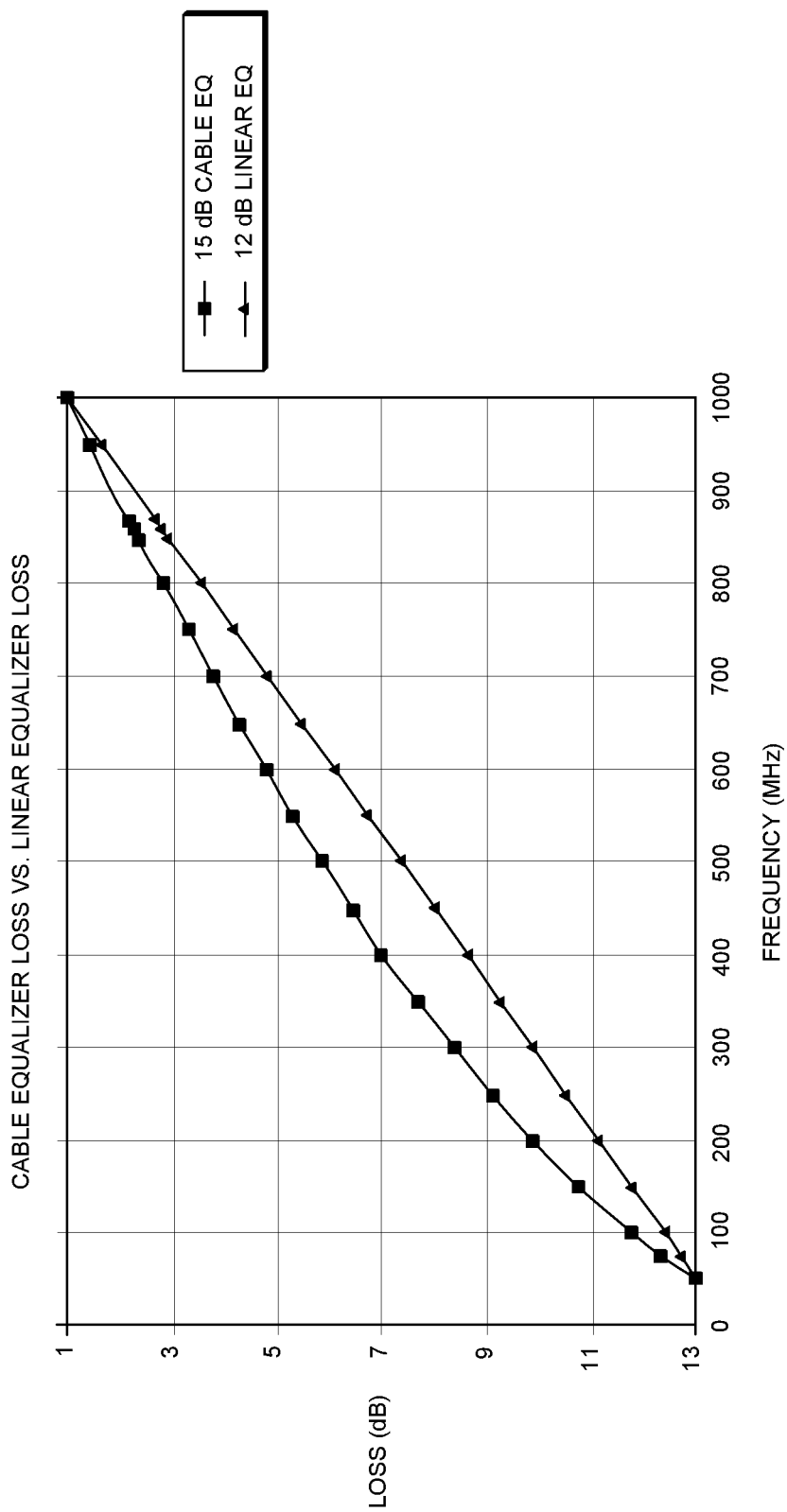
FIG. 4 illustrates a graph of cable equalizer loss versus linear equalizer loss.

When constructing a cable network, it is desirable to manage the non-equal loss in signal strength through the cable network that varies with frequency of the signal. In particular, the coaxial cables used in hybrid fiber networks have a greater signal attenuation at higher frequencies with respect to lower frequencies. Referring to FIG. 3, a plot of a coaxial cable loss versus frequency has a curved, down-tilted shape. To counteract the effect associated with the coaxial cable, cable equalizers are included in the cable network. Referring to FIG. 4, a plot of a cable equalizer loss versus frequency is illustrated. The dB value of the cable equalizer indicates an amount of signal conditioning that it is designed to apply for which is roughly equivalent to the difference in loss between its highest and lowest frequency of operation. Cable equalizers are often available as a plug in components in a wide range of fixed dB values. Often, the cable equalization is accomplished at the input of the amplifier in the downstream direction, with additional equalization between amplifier gain stages. Often, the cable equalization is accomplished at the output of the amplifier in the upstream direction, with additional equalization between amplifier gain stages.

The cable network may use up-tilted radio frequency cable amplifier output levels. Typically, the amplifier employs a "linear" output tilt, so that a plot of output level versus frequency is a straight line that tilts upward from low to high frequency. This resulting linear output tilt is produced at the node using a passive network referred to as a "linear" equalizer which assumes a certain amount of cable shape in the received signals which is compensated for (e.g., generally, the lower frequencies start with a lower dB/MHz per foot and with an increase in frequency have a greater dB/MHz per foot). As illustrated, this type of cable equalizer introduces a greater signal loss at lower frequencies, with a substantially linear shape. In general, to achieve nominal unity gain in a cable system, amplifier typically employ a combination of linear and cable shape equalization and while a linear equalization shapes the output spectrum from a node, the unity gain characteristics (linear plus cable (e.g., non-linear)) maintains the linear output levels at each amplifier. As it may be observed, the cable equalizer includes a generally uniform shape.

For the cable network, an amplifier provides a boosted signal for a section of the cable network. Along the cable network section, a series of taps of the coaxial cable may be provided, with each tap interconnecting one or more respective coaxial cables to one or more homes. A tap is used to connect "drop cables" to a "distribution cable" in the cable network.

In general, a cable simulator is a passive circuit that simulates the attenuation profile of a given cable response, so that the high frequencies are attenuated more than the lower frequencies. In general, an equalizer increases the tilt to offset for the attenuation of the higher frequency signals (e.g., high frequencies are attenuated less than the lower frequencies). The cable simulator and/or the equalizer may provide either a linear signal conditioning shape (e.g., substantially linear response), or may provide a non-linear signal conditioning shape that mirrors the frequency dependent loss profile of a coaxial cable.

For the cable network, as it may be appreciated, there are different losses at different frequencies at different points in the cable network system. It is desirable to include cable simulators and equalizers at various points in the system, such as at taps, amplifiers, fiber nodes, and stand-alone locations cut into services in the cable network, so that the customer receives a generally flat signal over the desired frequency range. The cable simulators and equalizers are typically included within a housing or with other circuitry where the cable simulators and equalizers can be plugged in as desired, and swapped out with different cable simulators and equalizers, as desired. For example, a module may include a face plate that is removed, an equalizer or cable simulator is plugged into the circuitry included therein, and the face plate is replaced.

Figure 5:
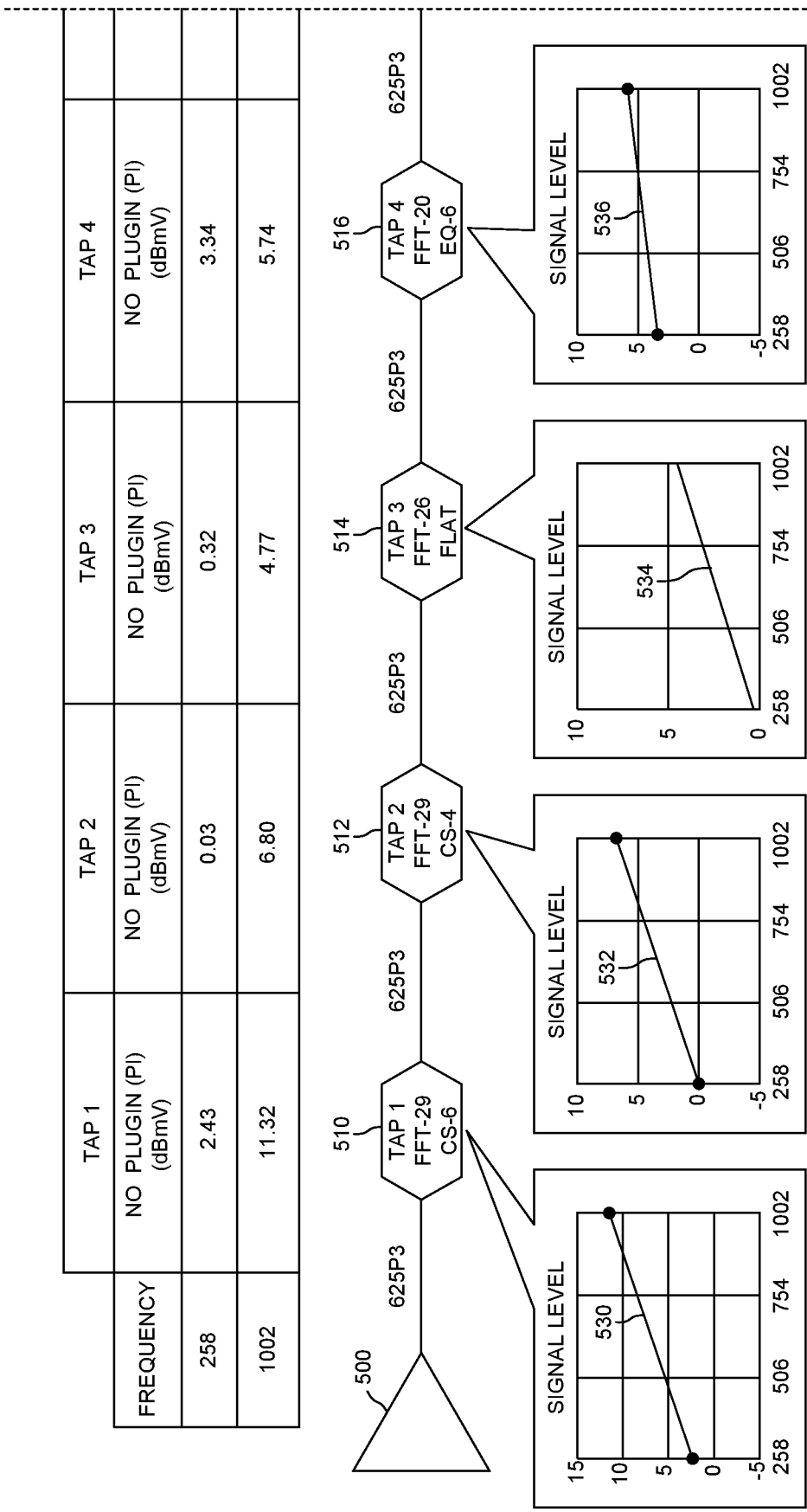
FIG. 5 illustrates the change in the frequency of a signal as it passes through a cable network.
Figure 5:
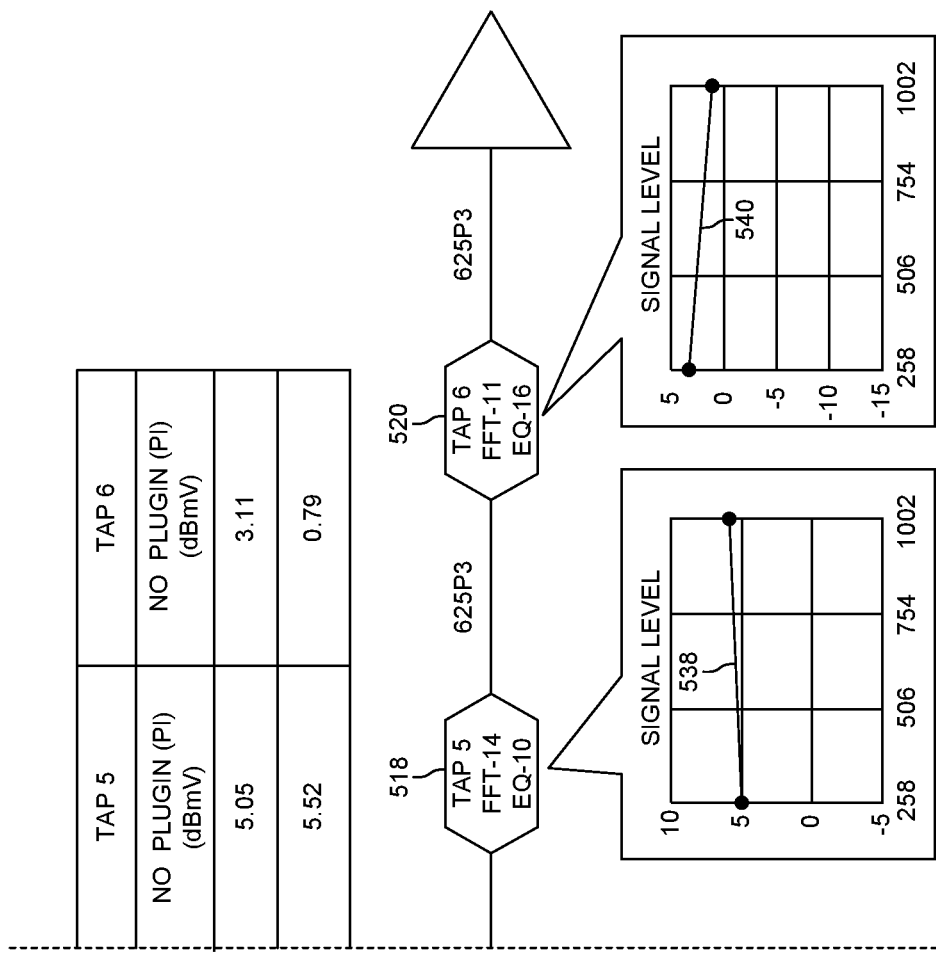

Referring to FIG. 5, an example is shown which illustrates the change in tilt of the signal through the cable network. The signal may originate from an amplifier 500 with a forward tilt. Without signal modification at a first tap 510 the signal 530 has attenuated its higher frequency signals more than its lower frequency signals. Additional taps are selected to compensate for coupled ports' levels based upon the combination of the cable spans between the taps 512, 514, 516, and 518 and the tap thru responses 532, 534, 536, 538. The cable simulator or equalizer that is selected at each tap is selected to compensate the cable spans between the taps, the tap thru responses, and the drop characteristics of the subscriber.

Figure 6:
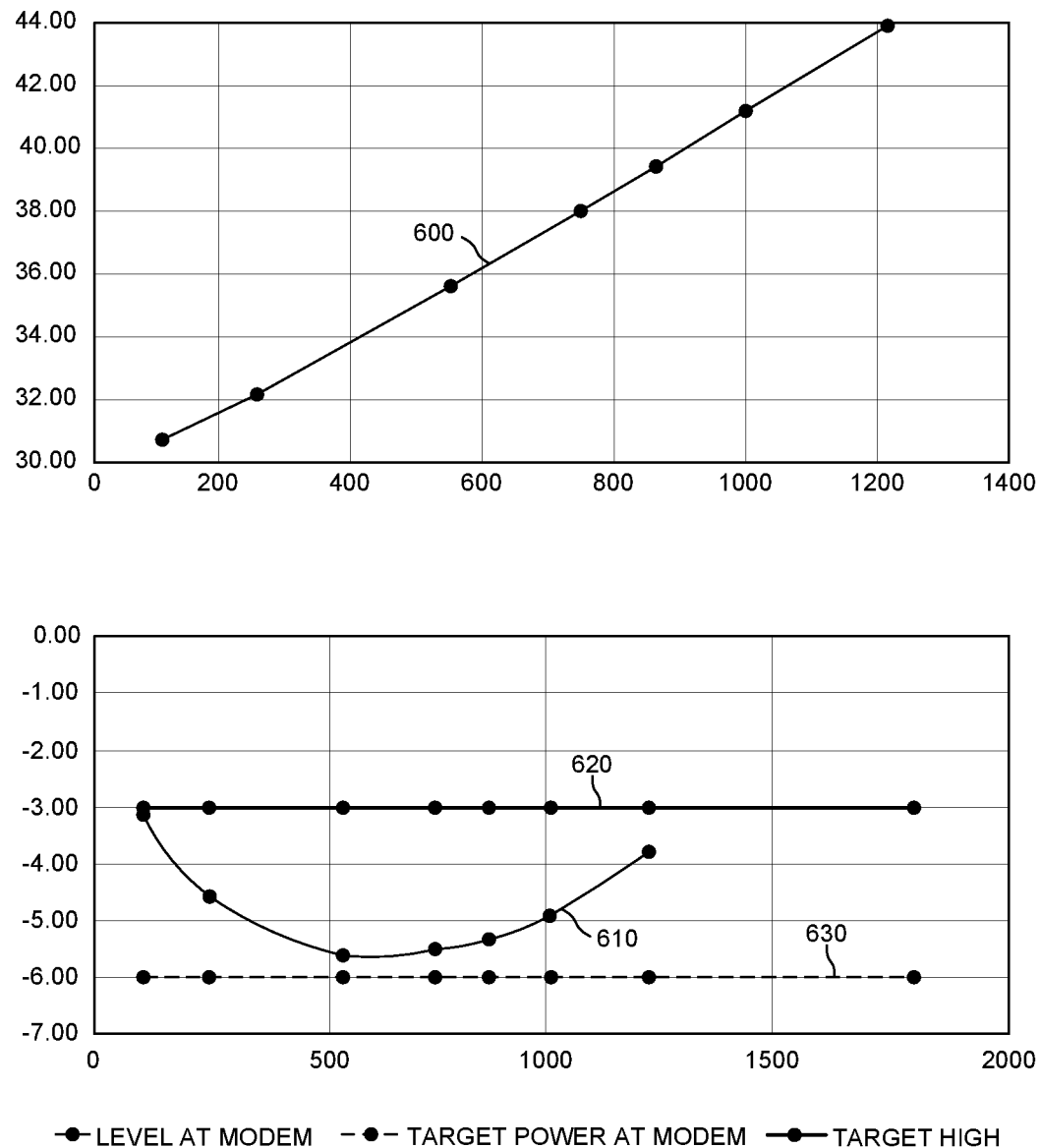
FIG. 6 illustrates a modification of an up-tilted signal for a modem.

Referring to FIG. 6, for example, the signal at a tap may have a substantial upward tilt 600. It is undesirable to have a signal with such a substantial upward tilt 600 be provided to a customer's modem and/or set-top box and/or gateway. Accordingly, a cable simulator may be inserted at the tap to attenuate the higher frequency signals and not attenuate the lower frequency signals as much. As a result of such an attenuation, a flatter signal 610 is provided to a modem and/or gateway that is preferably adjusted to be between a target low power 630 at the modem and/or gateway and/or set-top box and a target high power 620 at the modem and/or gateway and/or set-top box.

As illustrated in FIG. 6, some components of the cable network are designed to modify signals from a relatively low frequency, such as 5 MHz to a higher frequency, such as 1.0 GHz. While the frequency range to 1.0 GHz is suitable for many systems, there are systems where additional data carrying capabilities are desired which may use an extended frequency band up to 1.5 GHz-1.6 GHz-1.8 GHz-3.0 GHz or more. When evaluating the impact of a network upgrade when frequencies are extended to 1.5 GHz-1.6 GHz-1.8 GHz-3 GHz, the upgradability is generally assessed based on the span losses between amplifiers and the expected gain capabilities of a higher frequency amplifier design. Throughput gains are then calculated without regard for the cable simulators and equalizers that are required in order to balance the network. In the traditional approach, it is later, in the conversion planning phase where the plant designer selects cable simulators and equalizers that have a uniform signal conditioning shape to properly balance the network and preserve legacy services and customer premise equipment in existing customer locations. To accommodate the increased frequency bandwidth of the system, cable simulator and equalizer designs are extended in their frequency range from the relatively low frequency to 1.5 GHz-1.6 GHz-1.8 GHz-3 GHz, with a uniform linear (or non-linear function), with the selection of the appropriate device for a particular location in the cable network determined based upon the nature of the signal at that location.

Figure 7:
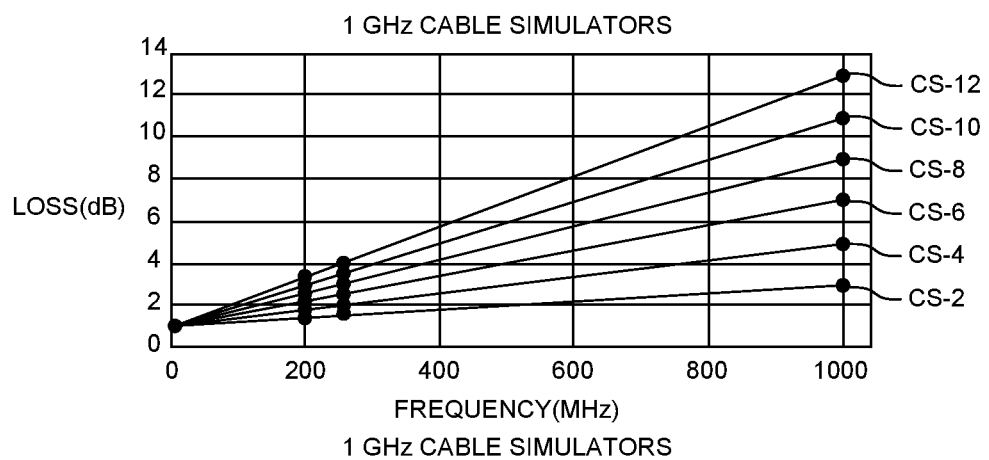
FIG. 7 illustrates a frequency response of 1 GHz cable simulators.
Figure 8:
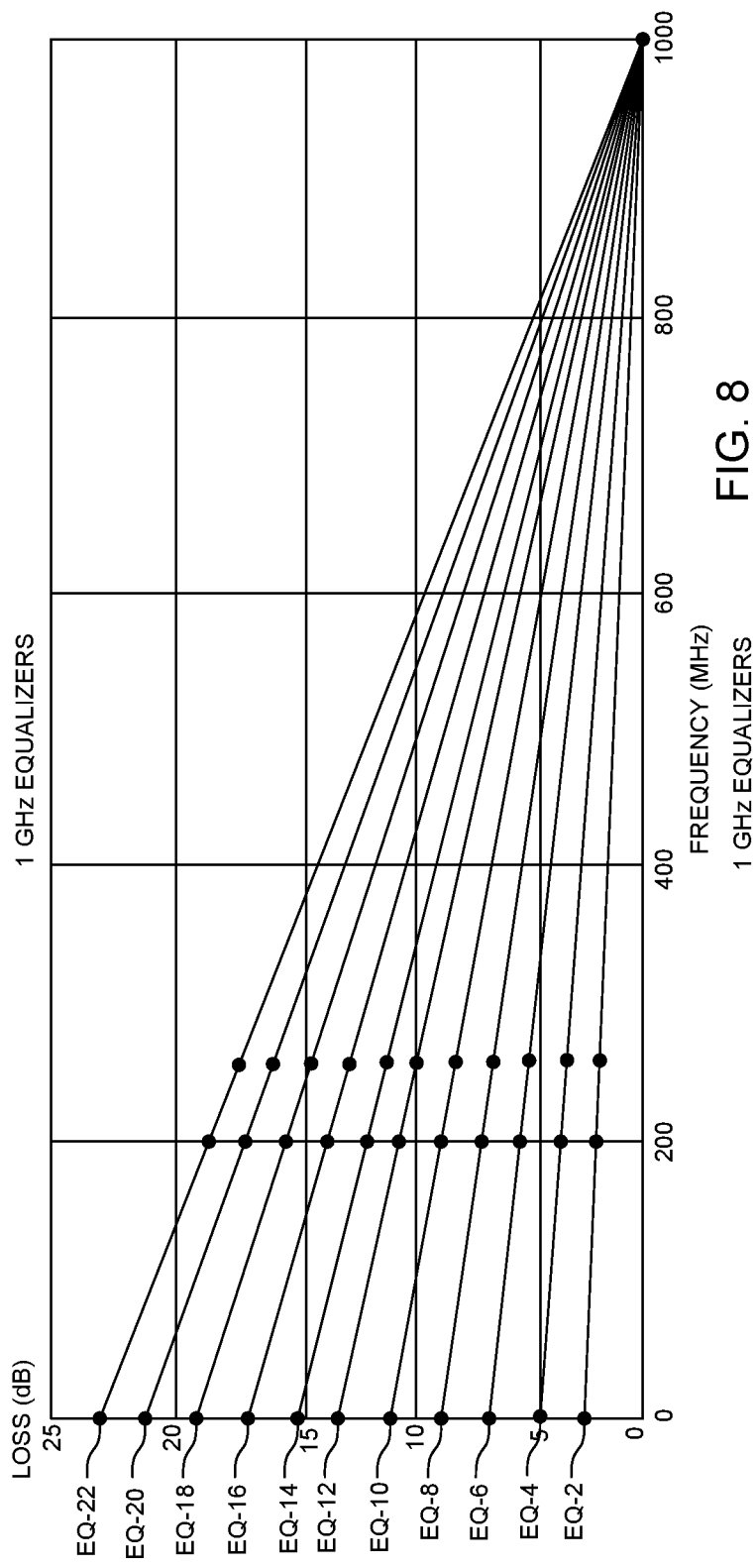
FIG. 8 illustrates a frequency response of 1 GHz equalizers.

To better understand the implications of extending the cable simulators and equalizers in their frequency range from the relatively low frequency to 1.8 GHz-3 GHz, with a linear function (or non-linear function), a set of graphs are illustrative. Referring to FIG. 7, the loss is illustrated for a series of different cable simulators CS-2, CS-4, CS-6, CS-8, CS-10, and CS-12. Referring to FIG. 8, the loss is illustrated for a series of different equalizers EQ-2, EQ-4, EQ-6, EQ-8, EQ-10, EQ-12, EQ-14, EQ-16, EQ-18, EQ-20, and EQ-22. As illustrated in FIG. 5, the deeper you go along a cable span, you select different devices to accommodate the nature of the signal at that depth in the cable network.

Figure 9:
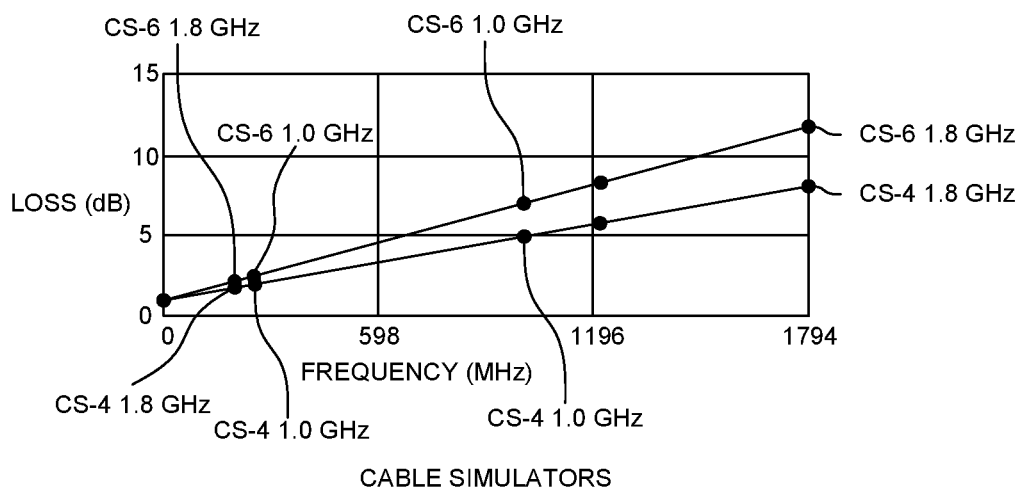
FIG. 9 illustrates a frequency response of 1.0 GHz and 1.8 GHz cable simulators.
Figure 10:
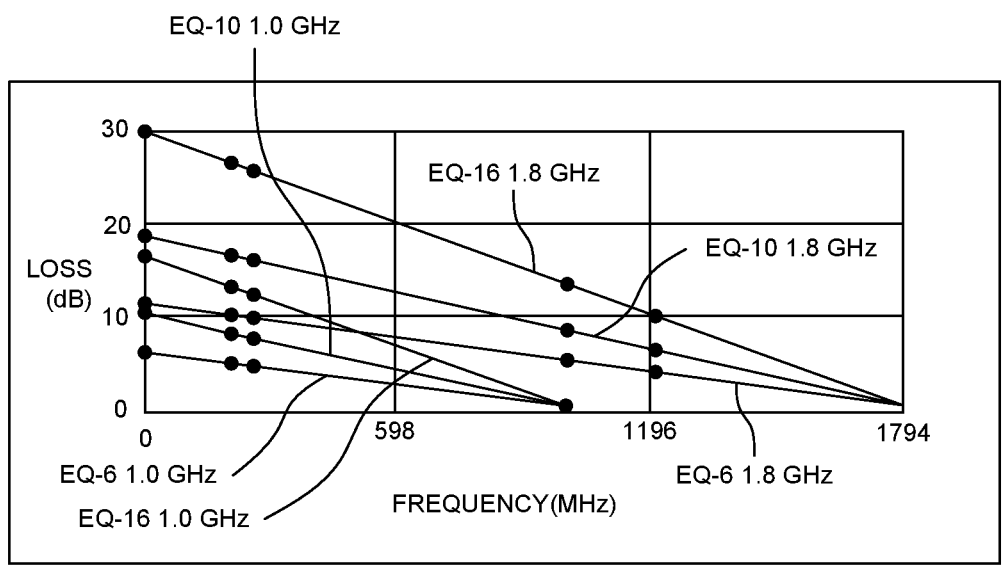
FIG. 10 illustrates a frequency response of 1.0 GHz and 1.8 GHz equalizers.

When the range of frequencies is extended to include 1.8 GHz, the curves of the cable simulators and equalizers are extended. Referring to FIG. 9, a pair of different cable simulators are illustrated CS-4 and CS-6, extending between a relatively low frequency and 1.0 GHz and extended to 1.8 GHz. As it may be observed, the linear response is extended and overlapping with one another over a portion of the response. It may also be observed that the loss for the upper frequency ranges of the 1.8 GHz cable simulators is substantial, and substantially greater than the 1.0 GHz cable simulators which do not operate in that extended range. Referring to FIG. 10, a set of three different equalizers are illustrated EQ-6, EQ-10, and EQ12, extending between a relatively low frequency and 1.0 GHz and extended to 1.8 GHz. As it may be observed, the linear responses are extended and non-overlapping with one another. As it may be observed, roughly the differences between the high frequency loss and the low frequency loss are preferably the same for same equalizer device number. It may also be observed, the loss for the lower frequency ranges of each of the 1.8 GHz equalizers is substantial, and substantially greater than that of the 1.0 GHz equalizers.

When modifying an existing cable network, there are already amplifiers in place, the network cabling is already installed, the distances of each of the sections of network cabling is already established, the distances between the network amplifiers are already established, and other components are already established in the network. The modification of such installed components to rebalance the cable network is prohibitively expensive to accommodate a frequency extension, especially considering the magnitude of service interruption times and the man/machine hours needed. This substantial additional cost, however, is inherent in such a modification to the system provided legacy equalization practices are maintained. The desirability is to maintain legacy drop/modem levels, when legacy equalization slopes are extended to accommodate the existing maximum frequency and utilizing passive equalization devices forces higher losses in the legacy band of such a system. With these higher losses, a corresponding increase in node and amplifier output power capabilities or a significant and unrealizable drop in tap losses is necessitated in order to satisfy the aforementioned legacy level requirement without respacing.

It was determined that it is desirable to have the capability to maintain the same, or substantially the same, cable simulator and equalizer characteristics for devices with capabilities to 1.2 GHz (or 300 MHz, 350 MHz, 450 MHz, 550 MHz, 650 MHz, 750 MHz, 870 MHz, 1 GHz, depending on the particular cable network) so that existing legacy devices are accommodated, while also providing reduced loss, for other devices that are capable of receiving signals in the extended band between the legacy band devices (e.g., 300 MHz to 650 MHz-1.0 GHz) and extended band devices (e.g., 1.2 GHz to 1.5 GHz-1.6 GHz-1.8 GHz-3.0 GHz).

It was determined that for cable networks, it is desirable to break with the traditional methodology of extending the uniform response of the cable simulator and/or equalizer, to make use of the fact that there exists a legacy band (e.g., 5 MHz to 1.0 GHz) and an extended band (e.g., 1.2 GHz to 1.5 GHz-1.6 GHz-1.8 GHz) each of which carry different signals and each of which may be treated differently. The break with the traditional methodology may involve each of the cable simulator and/or equalizer having a plurality of different linear (or non-linear) signal conditioning shapes. As opposed to using a single uniform response for the cable simulator and/or equalizer, it is desirable to include two or more uniform responses (and/or non-linear) for the cable simulator and/or equalizer that are selected in combination with the frequency ranges of the legacy band and the extended band.

Figure 11:
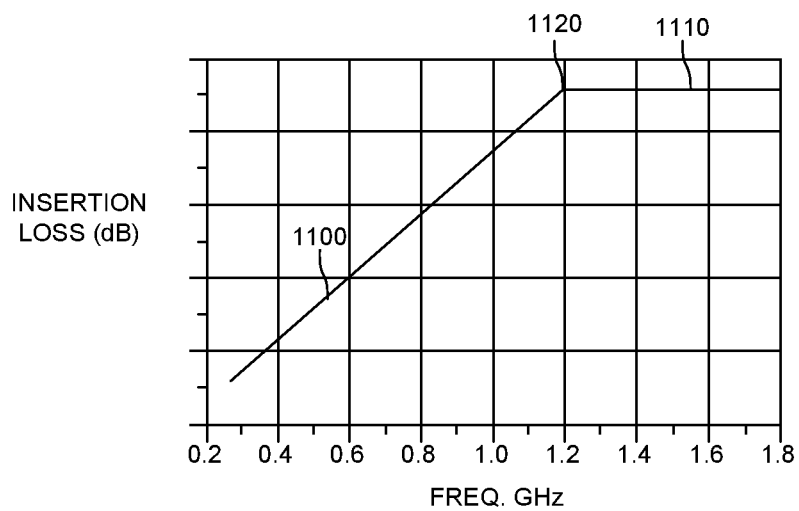
FIG. 11 illustrates the response of a multi-slope equalizer with a first uniform response for the legacy band, a second uniform response for the extended spectrum band, and a response discontinuity at the intersection of the two bands.

Referring to FIG. 11, it is desirable to include a first uniform (linear or curved) response 1100 for the legacy band of the cable network, namely, 5 MHz (or otherwise) to 300 MHz, 350 MHz, 450 MHz, 550 MHz, 650 MHz, 750 MHz, 870 MHz, 1 GHz, or 1.2 GHz (or otherwise). The frequency response in the legacy band is preferably designed to substantially match the characteristics of a traditional cable simulator and/or equalizer so that the modified cable simulator and/or equalizer is interchangeable with existing components in a manner that a customer with legacy capable equipment will not notice a substantial change. It is desirable to include a second uniform (or curved) response 1110 for the extended band of the cable network, namely, 1.2 GHz (or otherwise) to 1.5 GHz-1.6 GHz-1.8 GHz (or otherwise). The frequency response in the extended band is preferably designed to substantially match the slope characteristics of the legacy first linear response 1110 (e.g., the slope characteristics of the legacy plugin device), with the combination of the legacy band and the extended band being a multi-slope approach. The frequency response in the extended band may be different, if desired. The frequency response in the legacy band and the extended band may be different from one another, if desired. The discontinuity (e.g., non-uniform response, a response with a first derivative that changes sign, a response with an abrupt change, a substantial change in the characteristics of the response, a pair of responses with similar shaped curves that are linked together in some manner or not, or otherwise) in the frequency response 1120 is preferably aligned with the separation between the legacy band and the extended band, such that the discontinuity doesn't result in a loss of data. As it may be observed, in the legacy band the legacy levels and the legacy tilt is maintained. The legacy band typically includes services such as video, single carrier QAMS for DOCSIS 2.0 and DOCSIS 3.0 compliant devices, and OFDM for DOCSIS 3.1 compliant devices (e.g., modems, consumer premise equipment, set top boxes, gateways). As it may be observed, for a multi-slope equalizer the extended band slope is flattened to reduce the loss in the legacy band, and for a multi-slope cable simulator the extended band slope is flattened to minimize the extended band loss. As a result, the insertion loss is substantially reduced. It is also noted that the legacy band and the extended band may be defined in terms of the signaling. For example, a legacy band may extend between a $1^{st}$ frequency and a $2^{nd}$ frequency with the legacy devices being designed to accommodate a higher $3^{rd}$ frequency, where a portion of the legacy frequency band is not being used for signaling. In this case, the extended band defined in terms of signaling may extend from the $2^{nd}$ frequency to a $4^{th}$ frequency that is substantially greater than the $3^{rd}$ frequency. With such a configuration, the discontinuity in the multi-slope technique may not be aligned with the region between the legacy signaling band and the extended signaling band. For example, a set of services may be selected that are to be provided to the legacy non-ESD customers (e.g., non-ESD customers that cannot make use of such extended services) and such services are moved into a legacy band (which may or may not be the same legacy frequency band prior to such selection). Then the extended band may include those frequencies greater than the legacy frequency band, and the discontinuity in the multi-slope technique may be selected to be at a desirable location, either coinciding with the separation between the legacy signaling band and the extended signaling band, or at a greater frequency.

The legacy band of 1.2 GHz or less using DOCSIS 3.1 or less have signal to noise requirements and power level requirements that render the signal ineffective at levels of generally −15 dBmV or less. DOCSIS 4.0 which supports the extended band shares the same modulation and multiplexing as DOSCIS 3.1, but also adds the ability to operate at lower orders of modulation and lower power levels in the extended band, which tends to have reduced flatness requirements compared to legacy band (e.g., legacy services may be single carrier QAMs while extended services may be ODFM). Thus, with the lower power levels DOCSIS 4.0 supports best efforts to provide increased or high throughput of data through the upper frequency band at substantially reduced signal levels that may occur within the cable network.

Figure 12:
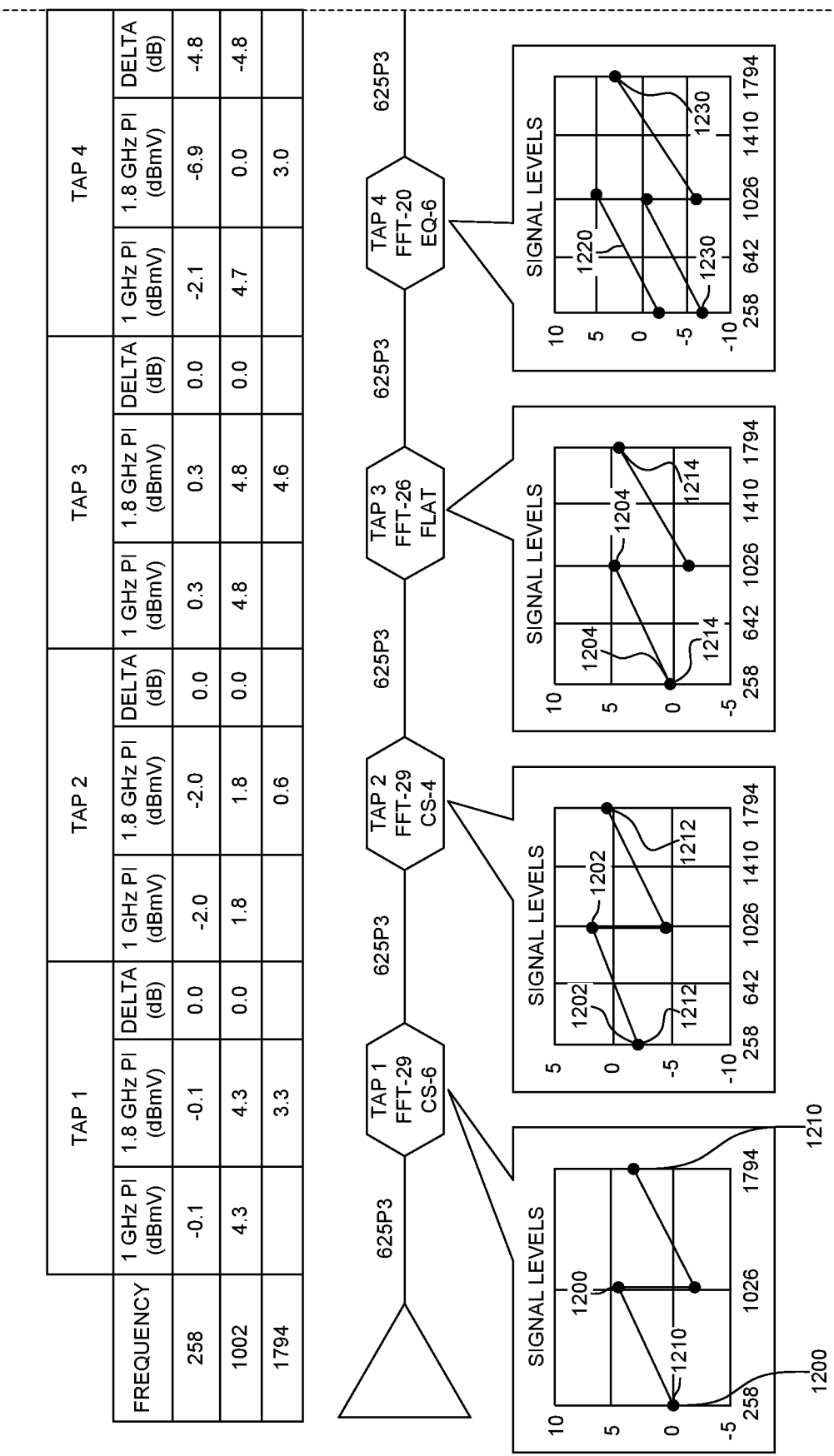
FIG. 12 illustrates a set of cable simulators and equalizers suitable for 1.8 GHz response including two linear responses are the result of a lightning bolt launch spectrum.
Figure 12:
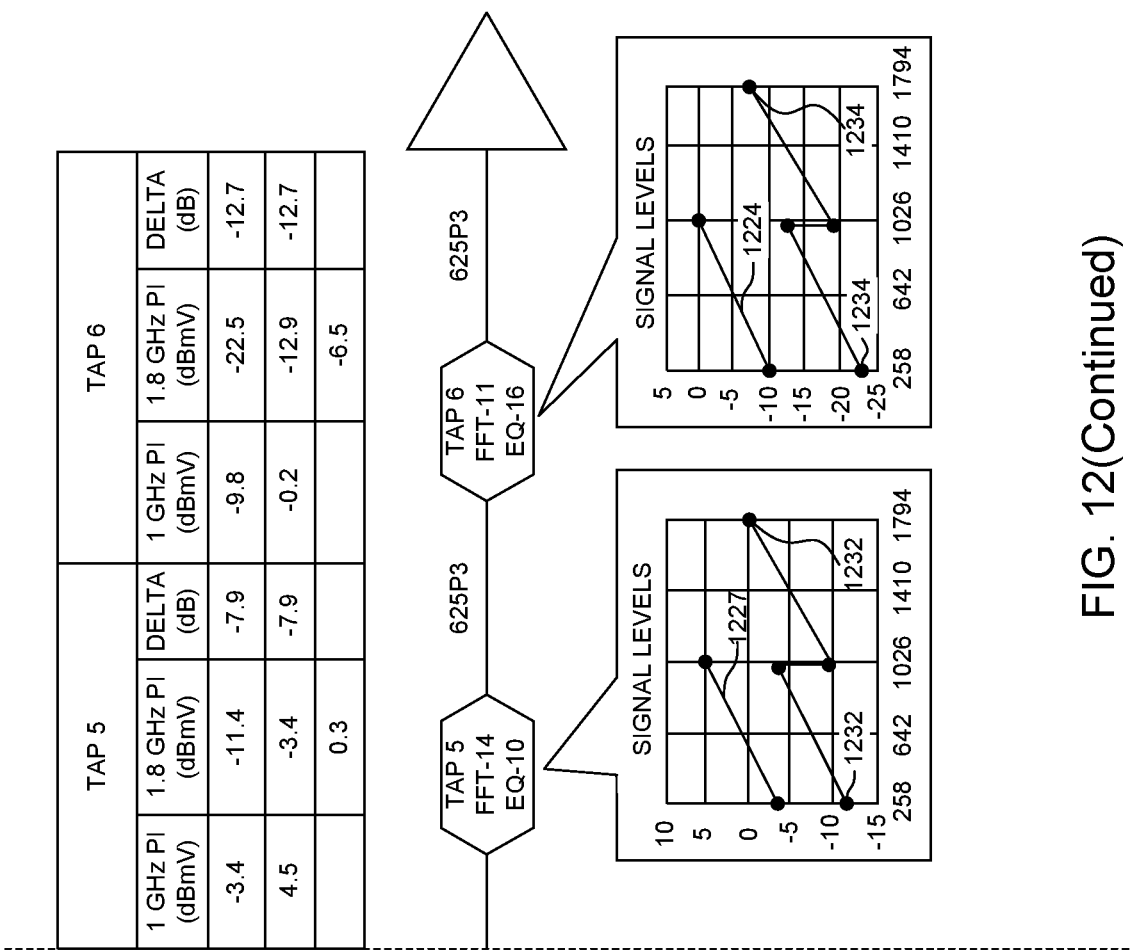

Referring to FIG. 12, a set of responses for 1.0 GHz cable simulators are illustrated 1200, 1202, 1204 (e.g., flat), and a set of responses for 1.8 GHz cable simulators are illustrated 1210, 1212, 1214. A set of responses for 1.0 GHz equalizers are illustrated 1220, 1222, 1224, and a set of responses for 1.8 GHz equalizers are illustrated 1230, 1232, 1234.

Figure 13:
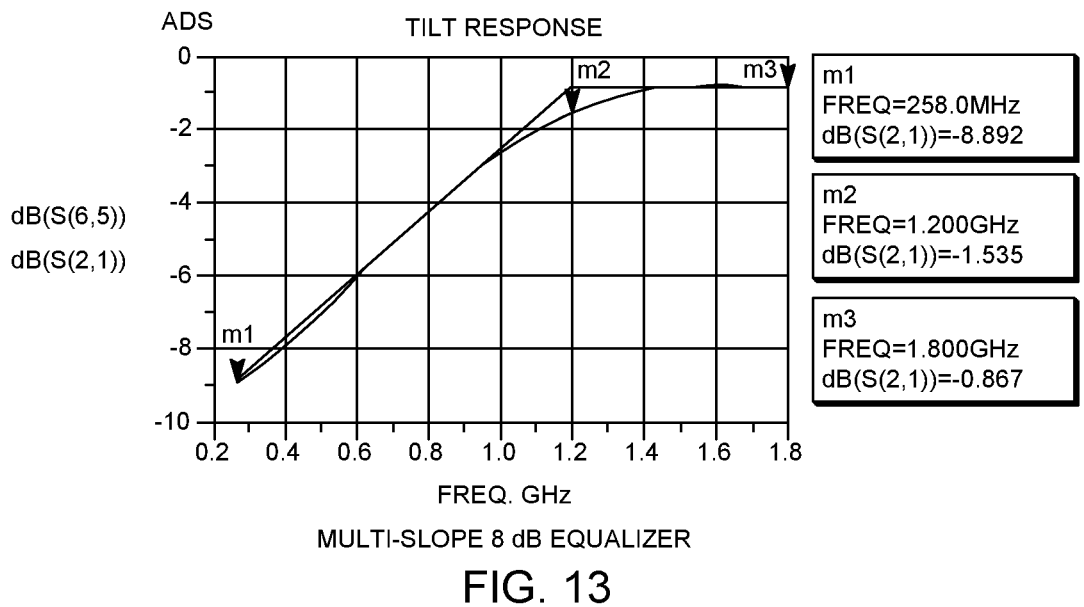
FIG. 13 illustrates an exemplary multi-slope 8 dB equalizer.
Figure 14:
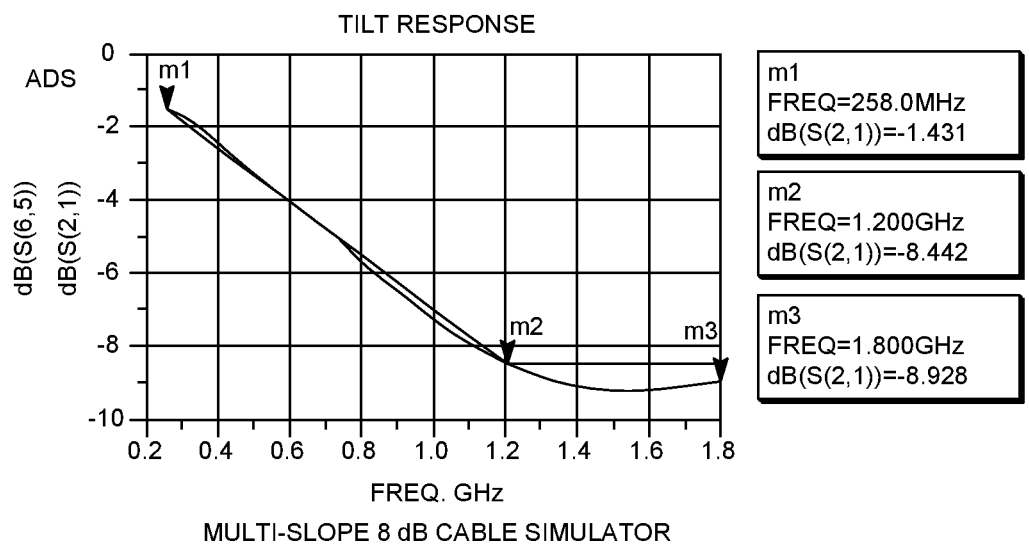
FIG. 14 illustrates an exemplary multi-slope 8 dB cable simulator.
Figure 15:
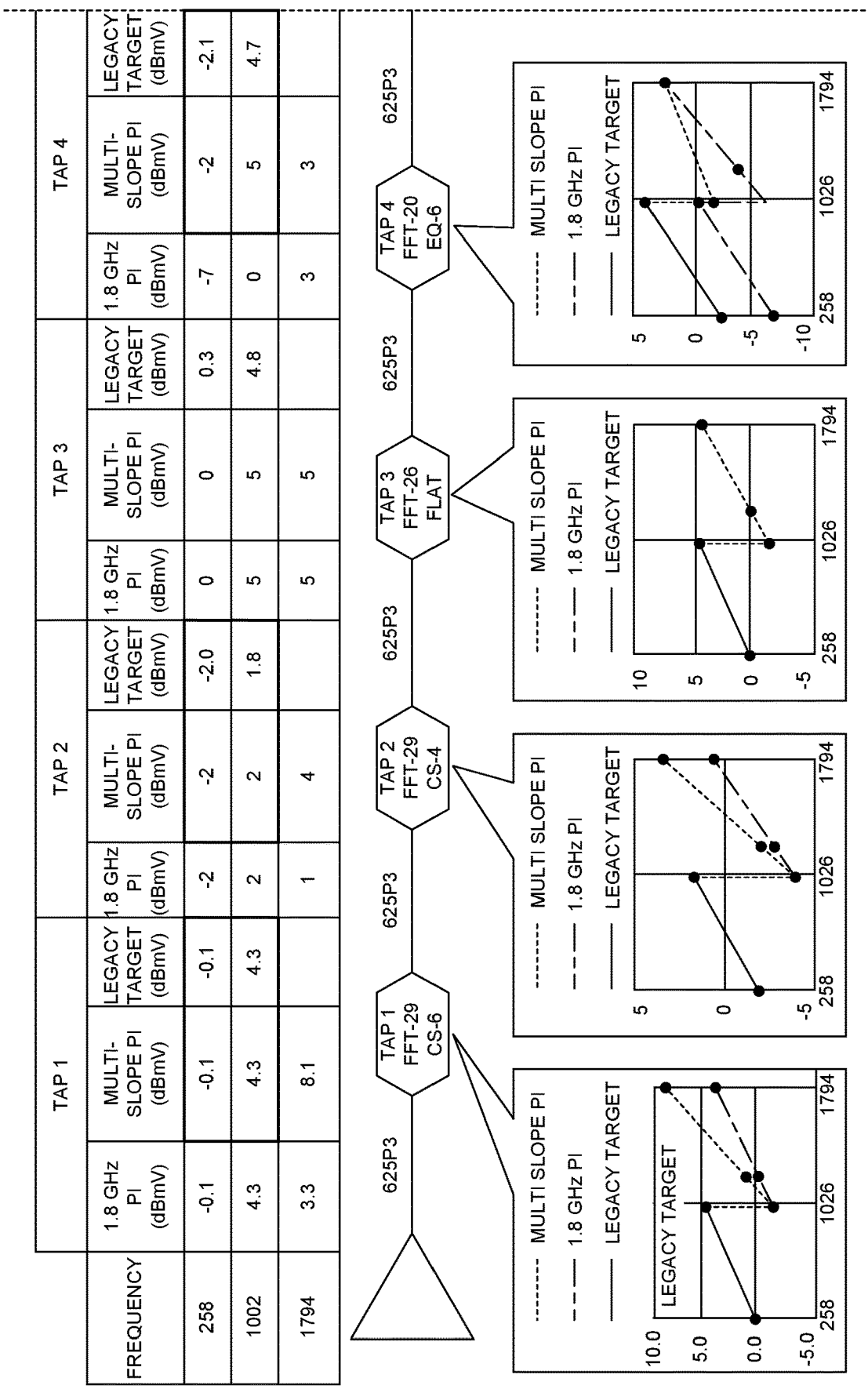
FIG. 15 illustrates an exemplary set of multi-slope signal conditioners.
Figure 15:
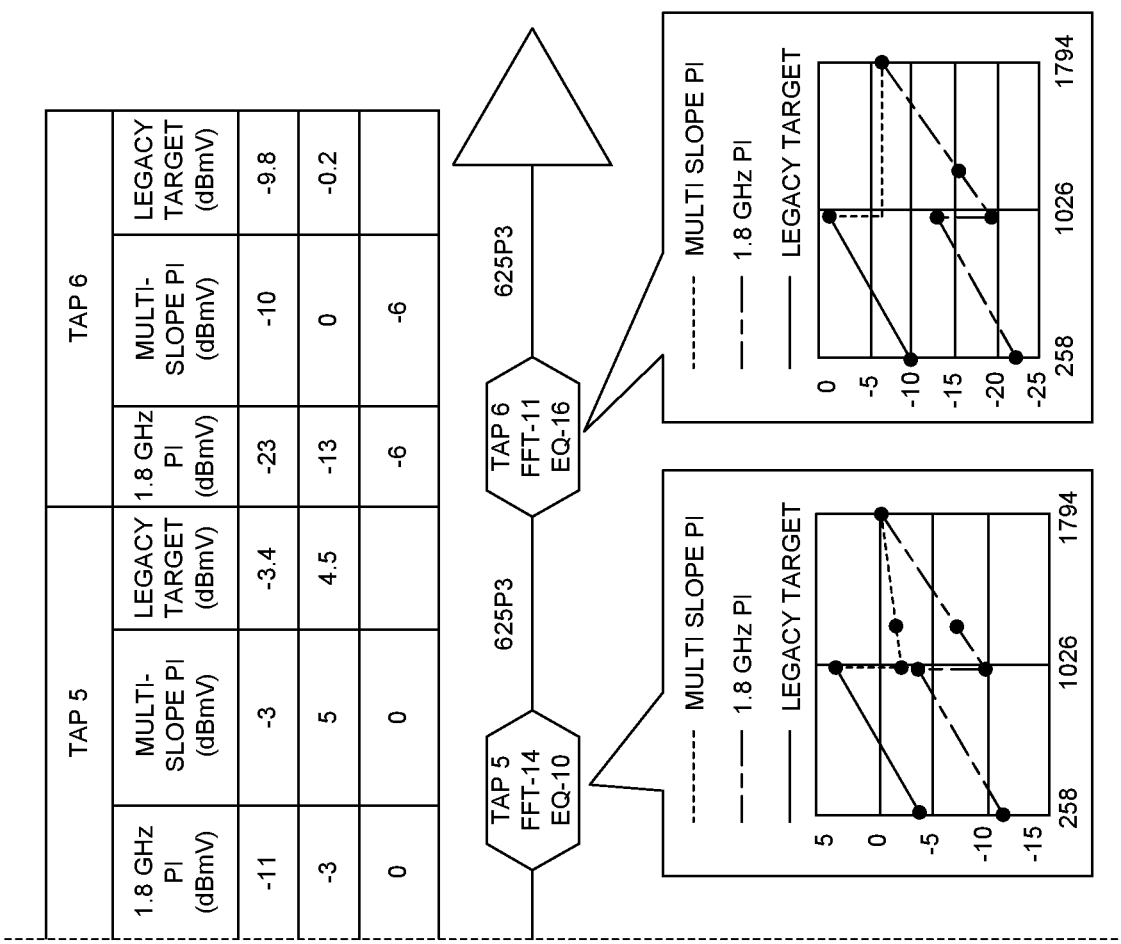

Referring to FIG. 13, an exemplary multi-slope 8 dB equalizer is illustrated. It is desirable that the "multi-slope" equalizer is designed to maximize channel loading and throughput by minimizing the insertion loss in the extended band and matching the slopes (e.g., responses) to the legacy equalizers and the legacy band. Referring to FIG. 14, an exemplary multi-slope 8 dB cable simulator is illustrated. It is desirable that the cable simulator is designed to minimize insertion loss in the extended band and maximize channel loading and throughput. Referring to FIG. 15, an exemplary set of multi-slope equalizers and cable simulators on a cable network is illustrated.

By way of example, an amplifier, a node, and a housing may be designed to support 1.2 GHz legacy band. In addition, the housing may be designed to also support the 1.2 to 1.8 GHz extended band. With such a configuration, the system will readily support the 1.2 GHz legacy band. When it is desired to extend portions of the cable network to support the extended band only the modules included within the housings need to be exchanged for an amplifier that supports the extended band and exchange the cable simulator and/or equalizer that supports the extended band. In this manner, the system may be readily upgraded to support the extended band in a piece meal manner without having to reconfigure other portions of the network.

It is noted that the transition between the legacy band and the extended band may be implemented in the way of a slope discontinuity between the two (or more) different curves. It is noted that the transition between the legacy band and the extended band may be implemented in the way of a change in the sign (positive "+", flat, or negative "−") of the first derivative between the two (or more) different curves. It is noted that the transition between the legacy band and the extended band may be implemented in the way of a function, albeit preferably within a limited frequency range, between the two (or more) different curves. It is noted that the legacy band typically extends between 5 MHz to 300 MHz, 350 MHz, 450 MHz, 550 MHz, 650 MHz, 750 MHz, 870 MHz, 1 GHz, or 1.2 GHz. It is noted that the extended band typically extends between 870 MHz-1.2 GHz to 1.5 GHz-1.6 GHz-1.8 GHz-3.0 GHz. The response may be provided by a single electrical component (having multiple parts), or a plurality of electrical components (each having multiple parts). It is noted that the legacy band characteristics of the cable simulator and/or equalizer is selected to compensate for the cable characteristics. It is noted that the extended band characteristics of the cable simulator and/or equalizer is not selected in the same manner to compensate for the cable characteristics, but rather to reduce losses.

Figure 16:
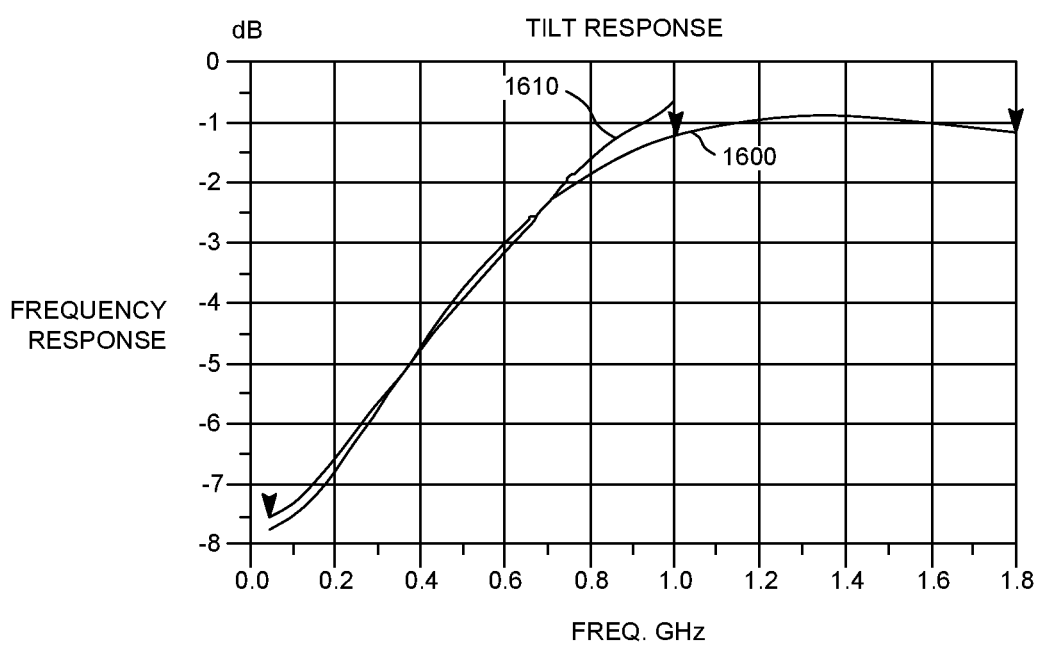
FIG. 16 illustrates an exemplary tilt response for an 8 dB multi-slope equalizer.

Referring to FIG. 16, an exemplary tilt response 1600 for an 8 dB multi-slope equalizer is illustrated. A legacy band from 5 MHz to 1 GHz is illustrated. The response of the legacy band of a multi-slope device 1600 is preferably the same as an existing legacy band response 1610. An extended band from 1 GHz to 1.8 GHz is illustrated. The extended band includes a uniform loss using a substantially flat response.

Figure 17:
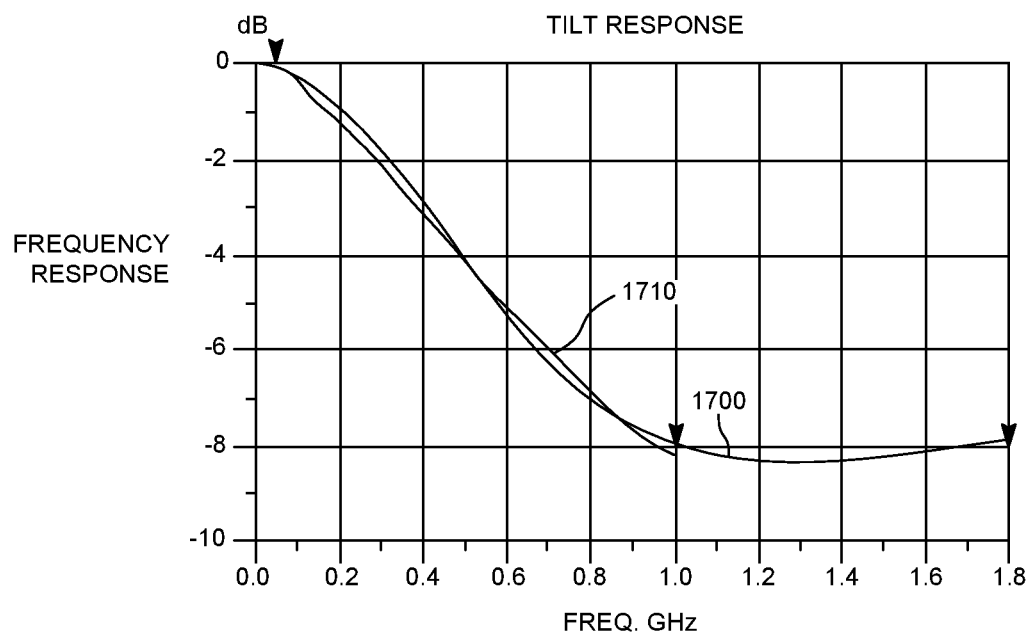
FIG. 17 illustrates an exemplary tilt response for an 8 dB multi-slope cable simulator.

Referring to FIG. 17, an exemplary tilt response 1700 for an 8 dB multi-slope cable simulator is illustrated. A legacy band from 5 MHz to 1 GHz is illustrated. The response of the legacy band of a multi-slope device 1700 is preferably the same as an existing legacy band response 1710. An extended band from 1 GHz to 1.8 GHz is illustrated. The extended band includes a uniform loss using a substantially flat response.

Figure 18:
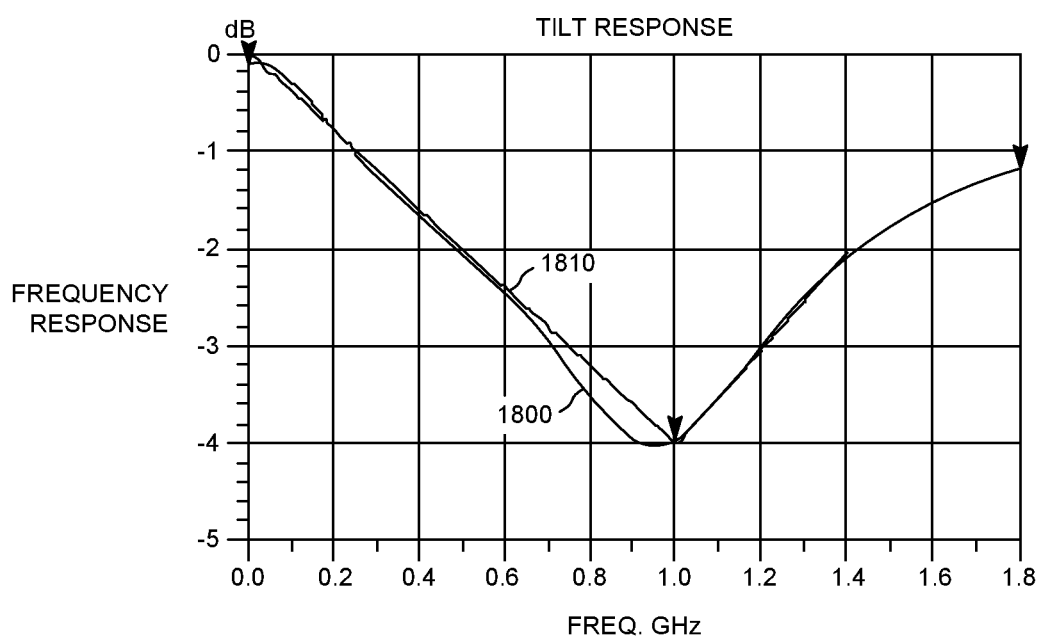
FIG. 18 illustrates an exemplary tilt response for a 4 dB multi-slope equalizer.

Referring to FIG. 18, an exemplary tilt response 1800 for a 4 dB multi-slope equalizer is illustrated. A legacy band from 5 MHz to 1 GHz is illustrated. The response of the legacy band of a multi-slope device 1800 is preferably the same as an existing legacy band response 1810. An extended band from 1 GHz to 1.8 GHz is illustrated. The extended band includes a generally minimized loss at each frequency.

As previously discussed, a single slope cable simulator and/or a single slope equalizer has traditionally always been used. One of the reasons is that there is a disconnect between the RF world and the data world for cable networks, and tilt is generally considered part of the RF world, as do plug-ins and signal conditioning, so the traditional approach has been maintained. As a result of evolution in the data world, including an increased tolerance to tilt by switching from SC-QAM to ODFM, and further enabled by the expanded receive power range in the ESD band in DOCSIS 4.0 systems that allows for additional tolerance of additional tilt, and the signal conditioning desired for the different bands and/or signaling. Moreover, it has traditionally been critical to hit the consumer premise equipment with a flat signal due to the lack of tilt tolerance, and single slop is how traditionally one would hit the consumer premise equipment flat across the entire band.

In contrast to the traditional methodology, one only needs to worry about this flatness in the legacy portion of the spectrum where it is servicing legacy consumer premise equipment that service should continue to be provided for in the traditional manner. As previously described, multi-slope allows one to do this without adding increased loss through the system as would occur if one were using single slope signal conditioning. Substantial the benefits of multi-slope are realized when converting an existing network to a higher bandwidth, rather than a greenfield. Since one tends to approach upgrades as if they were greenfield build-outs, there is a natural tendency to lean towards single slope signal conditioning. This becomes more important because of how expensive it is to respace amplifiers.

As previously described, respacing is when you need to move where the amplifier is in your network because the network cannot handle the losses that are introduced in the upgrade. Because the industry at large focuses exclusively on amp to amp span losses, and not drop losses, consumer premise equipment signal levels, and consumer premise equipment signal tilts in the legacy band when analyzing these upgrades, there is no consideration to how signal conditioning impacts the probability of respacing. In contrast, the vast majority of respacing events will not be driven by amp to amp losses, but rather the ability to deliver services to the last subscriber in the span. Multi-slope plug-ins minimize the number of respacing events that would be required and minimize the overall cost of the upgrade for the operator. Also, operators may want to stick with single slope on a tap that is shared between a legacy subscriber and an ESD subscriber in order to avoid adversely affecting the legacy subscriber.

With a general lack of understanding of how this works, one is not realizing that taking this approach will actually increase the losses that the legacy subscriber sees and would interrupt service. In contrast, it is the multi-slope approach that maintains legacy services as one increases the maximum frequency of an existing system. In order to manage the required total composite power that is required in an ESD upgrade, DOCSIS 4.0 introduces more complicated power spectrum shapes out of the nodes and amplifiers, such as the tilt-offset-tilt lightning bolt shape. As a result of these more complicated spectrums, it is harder to visualize the signal conditioning requirements and effects on received power.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:
1. An equalizer for a cable network comprising:
(a) said equalizer receiving an input signal having a frequency spectrum from an input coaxial cable;
(b) said equalizer modifying said frequency spectrum of said input signal using a first signal conditioning shape for a legacy band extending from 300 MHz to 650 MHz, where said modification includes a greater attenuation at 300 MHz relative to 650 MHz;
(c) said equalizer modifying said frequency spectrum of said input signal using a second signal conditioning shape for an extended band extending from 1.2 GHz to 1.5 GHz, where said first signal conditioning shape is different than said second conditioning shape;
(d) said equalizer providing an output signal to an output coaxial cable for a customer.

2. The equalizer of claim 1 wherein said legacy band extends from 50 MHz to 750 MHz.

3. The equalizer of claim 2 wherein said modification includes a greater attenuation at 50 MHz relative to 750 MHz.

4. The equalizer of claim 1 wherein said first signal conditioning shape is substantially linear.

5. The equalizer of claim 1 wherein said first signal conditioning shape is substantially non-linear.

6. The equalizer of claim 1 wherein said second signal conditioning shape is substantially linear.

7. The equalizer of claim 1 wherein said second signal conditioning shape is substantially non-linear.

8. The equalizer of claim 1 wherein a transition from said first signal conditioning shape to said second signal conditioning shape includes a discontinuity.

9. The equalizer of claim 8 wherein said discontinuity includes a frequency that includes a frequency range that includes 1.2 GHz.

10. A cable simulator for a cable network comprising:
(a) said cable simulator receiving an input signal having a frequency spectrum from an input coaxial cable;
(b) said cable simulator modifying said frequency spectrum of said input signal using a first signal conditioning shape for a legacy band extending from 300 MHz to 650 MHz, where said modification includes a lesser attenuation at 300 MHz relative to 650 MHz;
(c) said cable simulator modifying said frequency spectrum of said input signal using a second signal conditioning shape for an extended band extending from 1.2 GHz to 1.5 GHz, where said first signal conditioning shape is different than said second conditioning shape;
(d) said cable simulator providing an output signal to an output coaxial cable for a customer.

11. The cable simulator of claim 10 wherein said legacy band extends from 50 MHz to 750 MHz.

12. The cable simulator of claim 11 wherein said modification includes a lesser attenuation at 50 MHz relative to 750 MHz.

13. The cable simulator of claim 10 wherein said first signal conditioning shape is substantially linear.

14. The cable simulator of claim 10 wherein said first signal conditioning shape is substantially non-linear.

15. The cable simulator of claim 10 wherein said second signal conditioning shape is substantially linear.

16. The cable simulator of claim 10 wherein said second signal conditioning shape is substantially non-linear.

17. The cable simulator of claim 10 wherein a transition from said first signal conditioning shape to said second signal conditioning shape includes a discontinuity.

18. The cable simulator of claim 17 wherein said discontinuity includes a frequency that includes a frequency range that includes 1.2 GHz.

19. An equalizer for a cable network comprising:
(a) said equalizer receiving an input signal having a frequency spectrum from an input coaxial cable;
(b) said equalizer modifying said frequency spectrum of said input signal using a first signal conditioning shape for a legacy band of signaling within a first frequency range, where said modification includes a greater attenuation at a higher frequency than a lower frequency;
(c) said equalizer modifying said frequency spectrum of said input signal using a second signal conditioning shape for an extended band of signaling within a second frequency range, where said first frequency range is lower than said second frequency range, where said first signal conditioning shape is different than said second conditioning shape;
(d) said equalizer providing an output signal to an output coaxial cable for a customer.

20. A cable simulator for a cable network comprising:
(a) said cable simulator receiving an input signal having a frequency spectrum from an input coaxial cable;
(b) said cable simulator modifying said frequency spectrum of said input signal using a first signal conditioning shape for a legacy band of signaling within a first frequency range, where said modification includes a lesser attenuation at lower frequencies than at higher frequencies;
(c) said cable simulator modifying said frequency spectrum of said input signal using a second signal conditioning shape for an extended band of signaling for a second frequency range, where said first frequency range is lower than said second frequency range, where said first signal conditioning shape is different than said second conditioning shape;
(d) said cable simulator providing an output signal to an output coaxial cable for a customer.

* * * * *